United States Patent Office 3,706,760
Patented Dec. 19, 1972

---

3,706,760
4-CYANO-3β-ETHOXY-3-SECOYOHIMBANO [17,18-c]ISOXAZOLE
Jay Donald Albright and Leon Goldman, Nanuet, N.Y., assignors to American Cyanamid Company, Stamford, Conn.
No Drawing. Original application Sept. 9, 1968, Ser. No. 758,593, now Patent No. 3,576,004. Divided and this application Jan. 11, 1971, Ser. No. 105,640
Int. Cl. C07d 85/22
U.S. Cl. 260—307 D          1 Claim

ABSTRACT OF THE DISCLOSURE

The disclosure describes 4-cyano-3β-ethoxy-3-secoyohimbano[17,18-c]isoxazole useful as an analgesic agent.

CROSS REFERENCE TO RELATED APPLICATIONS

This application is a division of our copending application Ser. No. 758,593, filed Sept. 9, 1968, now U.S. Pat. No. 3,576,004.

BRIEF SUMMARY OF THE INVENTION

This invention relates to a new organic compound and, more particularly, is concerned with 4-cyano-3β-ethoxy-3-secoyohimbano[17,18-c]isoxazole.

DETAILED DESCRIPTION OF THE INVENTION

The novel compound of the present invention is an active analgesic when measured by the "writhing syndrome" test for analgesic activity as described by Siegmund et al., Proc. Soc. Exptl. Biol. Med., vol. 95, p. 729 (1957), with modifications. This method is based upon the reduction of the number of writhes following the intraperitoneal injection of one mg./kg. of body weight of phenyl-p-quinone in male Swiss Albino mice weighing 15–25 grams per mouse. The syndrome is characterized by intermittent contraction of the abdomen, twisting and turning of the trunk, and extension of the hind legs beginning 3 to 5 minutes after injection of the phenyl-p-quinone. The test compound is administered orally to groups of two mice each 30 minutes before injection of the phenyl-p-quinone. The total number of writhes exhibited by each group of mice is recorded for a 3 minute period commencing 15 minutes after injection of the phenyl-p-quinone. A compound is considered active if it reduces the total number of writhes in two test mice from a control value of approximately 30 per pair to a value of 18 or less. In a representative operation, 4-cyano-3β-ethoxy-3-secoyohimbano[17,18-c]isoxazole showed analgesic activity when tested by this procedure at an oral dose of 25 mg./kg. of body weight. If desired, the median effective dose ($ED_{50}$) may be calculated from the results obtained by repeating this test in multiple groups of two mice each at each of several graded dose levels.

The invention will be described in greater detail in conjunction with the following specific example.

Example 1.—Preparation of 4-cyano-3β-ethoxy-3-secoyohimbano[17,18-c]isoxazole

To a solution of 6.39 g. of yohimbano[17,18-c]isoxazole in 100 ml. of chloroform and 50 ml. of ethanol was added 2.84 g. of diisopropylethylamine and 2.12 g. of cyanogen bromide. The mixture was allowed to stand at room temperature for 17 hours and was concentrated to near dryness under reduced pressure. The residue, containing gummy material, was diluted with water and the brown solid which separated was removed by filtration and washed with water. Air drying gave 8.00 g. of product. Crystallization from ethyl acetate with the aid of activated carbon gave 1.80 g. of orange-brown crystals which were triturated with methanol and filtered to give 1.30 g. of orange-brown crystals, M.P. 205–210° C. An additional 1.20 g. of crystals, M.P. 190–195° C., was obtained from the methanol filtrate. Recrystallization of the combined crops from ethanol gave 1.35 g. of 4-cyano-3β-ethoxy-3-secoyohimbano[17,18-c]isoxazole as orange-brown crystals, M.P. 208–211° C.

We claim:
1. 4-cyano - 3β - ethoxy - 3 - secoyohimbano[17,18-c]-isoxazole.

References Cited
UNITED STATES PATENTS
3,576,004   4/1971   Albright et al. _____ 260—326.3

NICHOLAS S. RIZZO, Primary Examiner
R. V. RUSH, Assistant Examiner